April 27, 1965     E. S. TUPPER     3,180,540
PITCHER AND COVER
Original Filed Jan. 4, 1960     2 Sheets-Sheet 1
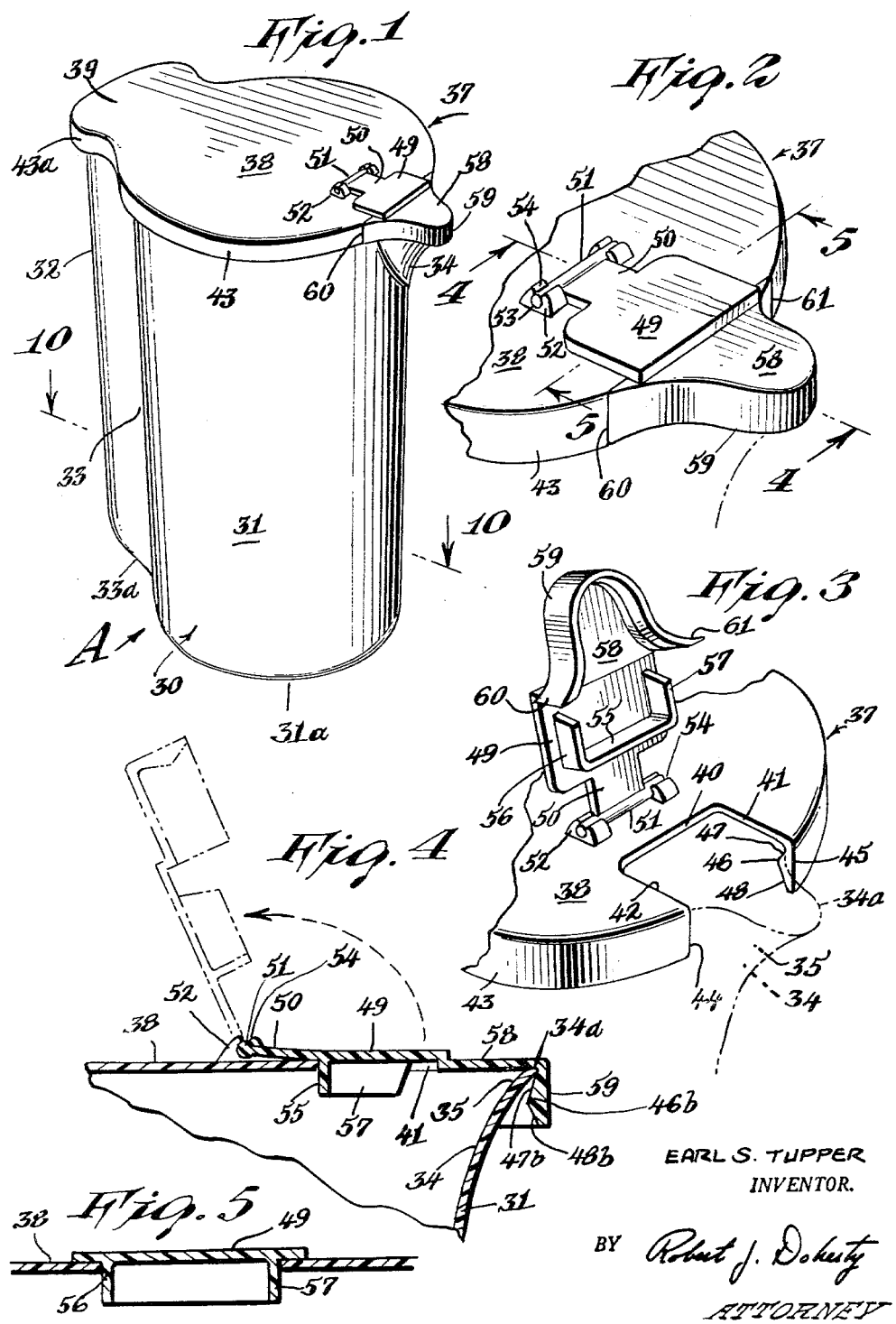
EARL S. TUPPER
INVENTOR.
BY Robert J. Doherty
ATTORNEY April 27, 1965 E. S. TUPPER 3,180,540
PITCHER AND COVER
Original Filed Jan. 4, 1960 2 Sheets-Sheet 2
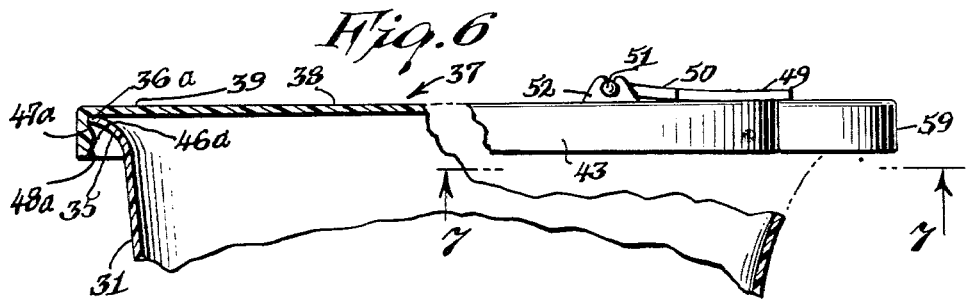
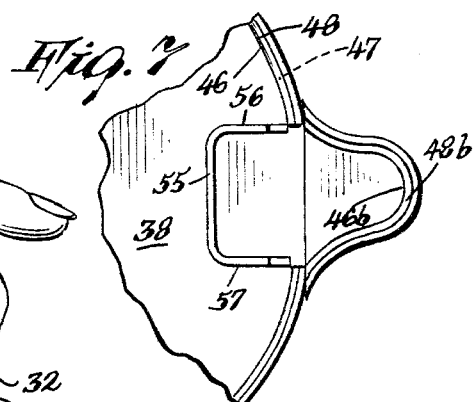
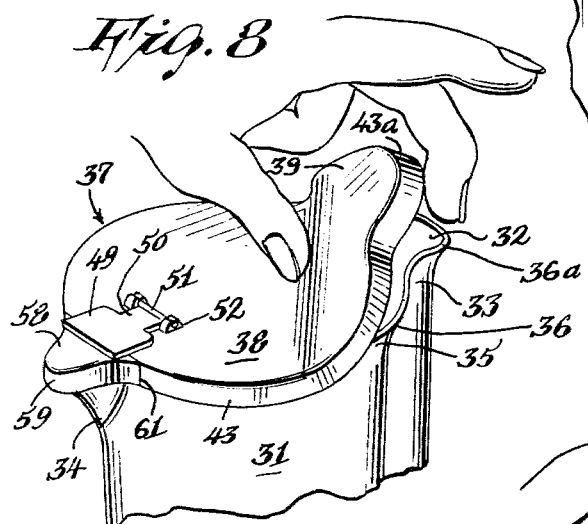
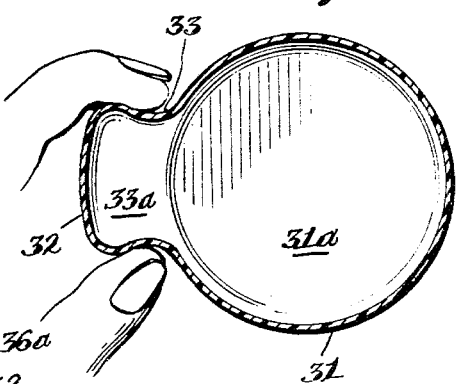
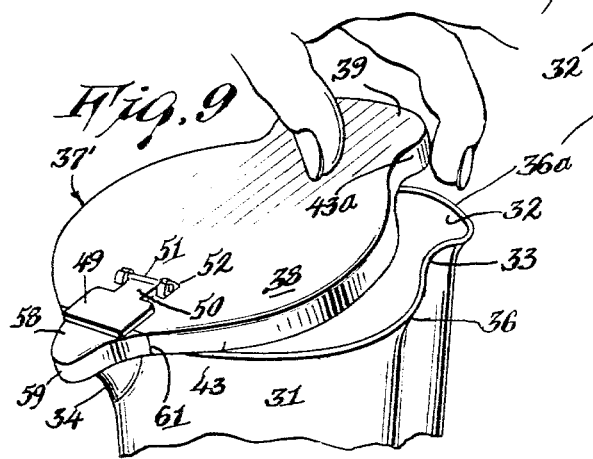
EARL S. TUPPER
INVENTOR.
BY Robert J. Doherty
ATTORNEY

United States Patent Office 3,180,540
Patented Apr. 27, 1965

3,180,540
PITCHER AND COVER
Earl S. Tupper, Esmond, R.I., assignor to Rexall Drug and Chemical Company, Los Angeles, Calif., a corporation of Delaware
Original application Jan. 4, 1960, Ser. No. 297, now Patent No. 3,081,010, dated Mar. 12, 1963. Divided and this application May 16, 1962, Ser. No. 205,141
3 Claims. (Cl. 222—545)

This invention relates generally to covered hollow vessels including pitchers and canisters provided with independently sealable pouring spout elements; but more specifically to a type of vessel wherein the frictional and sealing joint formed by and between the several members is rigid owing to at least one of the joint cooperating members being formed of a high density olefinic polymer or copolymer.

Such polymers as high density polyethylene and high density polypropylene, at least after a molding operation, afford (1) internal properties of substantial rigidity and (2) surface properties of resilient deformability. Consequently, joints and couplings including such materials afford gasketing effects as has heretofore been disclosed in applicant's invention covered by U.S. Patent No. 2,859,786 and dated November 11, 1958.

An object of the present invention, therefore, is to improve the structure of covered vessels, pitchers and canisters having independently sealable pouring spout elements for efficient, sturdy, safe and durable operation in the disposal, storage and transportation of fluid and comminuted contents of low and high weight loads in household and domestic, industrial, commercial and other fields.

Another object of the invention resides in cover structure in cooperation with the complementary vessel, pitcher or canister structure of all regular and irregular shapes which is effective to afford a rigid, substantially seal-tight and strong joint therewith and wherein said cover structure further affords a spout function in association with the vessel.

This application is a division of Tupper application Serial No. 297, filed January 4, 1960, now U.S. Patent No. 3,081,010 and is a continuation-in-part of U.S. Patents Nos. 2,950,847; 2,842,167 and 2,859,786; and is an improvement over applicant's inventions covered in: U.S. Patent No. 2,487,400 dated November 8, 1949; U.S. Patent No. 2,610,490 dated September 16, 1952; U.S. Patent No. 2,764,199 dated September 25, 1956; U.S. Patent No. 2,789,608 dated April 23, 1957; U.S. Patent No. 2,842,167 dated July 8, 1958.

Although pitchers, canisters, covers and spout elements for storage and dispensing purposes have been and are in present use, drawbacks have been recognized such as loose connections owing to failure of frictional fits, difficult removability or separation of parts, exposure of vessel contents to surrounding atmospheric conditions, inadequate spout closures, decomposition of residual vessel content portions remaining in exposed areas after dispensing and contamination between the vessel contents and the vessel parts, and difficulty in cleaning the cover and spout elements.

Such drawbacks are not only overcome by the instant invention but other objects and advantages of the invention will hereinafter appear in the progress of the disclosure and as pointed out in the appended claims.

Accompanying this specification are drawings showing several forms of the invention wherein:

FIGURE 1 is a view in perspective of one form of the invention showing a vessel having a spout and a cover in closed relationship, the cover being provided with a spout closure also in closed position;

FIGURE 2 is a fragmentary view in perspective of said cover and spout closure, the latter being in closed position;

FIGURE 3 is a fragmentary view in perspective similar to FIGURE 2 showing the spout closure in open position and associated with a vessel shown in phantom;

FIGURE 4 is a fragmentary sectional view of FIGURE 2 across the plane 4—4 and wherein the spout closure is shown in open position as well as in phantom;

FIGURE 5 is a fragmentary sectional view of FIGURE 2 across the plane 5—5 thereof;

FIGURE 6 is an enlarged side view of the upper part of the device of FIGURE 1 shown partly in section;

FIGURE 7 is a fragmentary bottom plan view of FIGURE 6 across the plane 7—7;

FIGURE 8 is a fragmentary view in perspective of the device of FIGURE 1 showing the initial step for removing the cover member from the vessel when said cover member is formed of flexible material;

FIGURE 9 is a view similar to FIGURE 8 showing the initial step for removing the cover member when said cover member is formed of substantially rigid material; and, FIGURE 10 is a sectional view of FIGURE 1 across the plane 10—10 thereof.

In accordance with the invention and the preferred forms shown, embodiment A shown in FIGURES 1–10 illustrates a hollow vessel generally indicated by numeral 30. The vessel is of any desired shape but as shown has a hollow and content communicating handle member. Thus, the vessel having a side wall 31 and a bottom wall 31a is shown to have an offset intermediate side wall portion 32 joined to the side wall by inwardly extending finger gripping portions 33 and by a bottom wall 33a. As shown bottom wall 33a is spaced above the bottom of the vessel.

Vessel side wall 31 is formed with a protruding spout 34, the upper open edge 34a thereof being in the same horizontal plane with vessel side wall open top edge 36 and handle portion open top edge 36a, all of said edges being integrally continuous and forming the top peripheral edge of vessel 30 as shown best in FIGURES 3 and 9. Said composite and continuous peripheral open top edge 34a–36–36a forms the upper terminal of an integrally continuous and outwardly flared upper portion 35 of the vessel 30 including portions of spout 34, side wall 31 and handle 32–33–33a respectively.

As shown, the outwardly flared upper portion 35 of vessel 30 terminating in said continuous edge 34a–36–36a constitutes curved peripheral rim portions tangentially continuous and of dissimilar curvature for tight, frictional and continuous sealing engagement with the peripheral engaging skirt of a correspondingly shaped cover member at the perimeter, said cover member generally being indicated by numeral 37, such type of engagement having been heretofore disclosed in applicant's invention covered by the aforesaid U.S. Patent No. 2,789,608.

A cover member for embodiment A and indicated by numeral 37 is removable and serves as a seal-tight, live, and frictionally engageable closure for vessel 30 and the communicating hollow handle. The spout is closed, however, by an independent live and frictionally engageable closure as will appear.

Cover member 37 has a top wall 38, flat as shown, has an extending portion 39 for overlying the handle mouth (see FIGURES 8 and 9), and axially opposite is an inwardly extending notch for straddling and extending spout 34 as seen in FIGURE 3. The notch as shown is rectangular having a rear wall 40 and side walls 41 and 42, the latter terminating forwardly at the spaced edges 44 and 45 (see FIGURE 3) of a continuous skirt 43–43a depending from the cover top wall 38 and wall extension 39.

Skirt 43–43a adapted to engages the flared portions 35.

of vessel wall 31 and handle walls 32 and 33, at the inner face has an intermediate continuous annular rim 46 and 46a from which inner face wall portions are oppositely sloped as at 47 and 48 and 47a and 48a. The lower inner face wall portions 48 and 48a serve to effect registration with and entry of vessel and hollow handle edges 36 and 36a for forceably clearing the annular rims 46 and 46a whereupon the cover member snaps into engagement with the vessel. A live, seal-tight, frictional, positive, and durable joint is effected between vessel edges 36–36a and skirt wall faces 47–47a. To effectuate such joint characteristics, the overall dimensions of vessel edges 36 and 36a exceed the largest overall dimensions of skirt wall faces 47 and 47a and the overall dimensions of annular rims 46 and 46a.

Vessel 30 is formed of an inert plastic preferably not requiring chemical plasticizers for contamination prevention of the contents. Moreover, it is desirable that such vessel be relatively rigid and also present at the juncture with the cover member a deformable surface for live, frictional and seal-tight engagement. For this reason, a high density olefinic polymer or copolymer including polyethylene and polypropylene is preferably utilized for molding the vessel. On the other hand, the cover member 37 may be molded of the same plastic material for giving added rigidity to the junction with the container; or may be formed of less rigid and resiliently flexible material including the low density olefinic polymers and copolymers as locally deformable polyethylenes and polypropylenes.

The independent and openable closure for spout 34, associated with cover member 37 and operable therewith when said cover member is in sealing engagement with vessel 30, is adapted to sealably engage and overlie the cover notch having walls 40, 41 and 42, to bridge and seal the opening of cover skirt 43 between open edges 44 and 45 and to sealably engage the flared edge 35 of spout 34 as seen in FIGURES 2–4. Moreover, as seen in embodiment A, the closure is in removable and hinged engagement with cover 37.

The spout closure is preferably molded or formed of the same material as cover member 37 and comprises a main body 49 adapted to overlie, contact, seal and extend beyond the edges 40, 41 and 42 of the cover top wall notch. Body 49 is further provided with a rear tongue extension 50 having in connection with cover top wall 38 a hinge element such as an integral and projecting pintle 51 of larger diameter than the thickness of body 49 and formed as the rear edge of said extension. The pintle 51 is adapted to slide in and out of a pair of spaced lugs 52 secured to cover top wall 38 and having aligned openings 53 for lateral pintle passage therethrough. Lugs 52 also have top entry notches 54 (see FIGURE 2) for openings 53 whereby body 49 may pass therethrough during lateral introduction and removal of pintle 51 in the lugs 52.

As shown in embodiment A, closure body 49 inwardly of the edges is provided with a depending U-shaped skirt having a rear wall or base 55 and side arms 56 and 57 for centering with and for frictional engagement with the corresponding notch edge walls 40, 42 and 41 respectively. Body 49 is further provided with a forward and down-stepped extension 58 having a perimetric shape corresponding to spout open top edge 34a and also having a depending skirt 59 to frictionally and sealably engage the flared edge portion 35 of spout 34. The inner face of skirt 59 has similar structure as the inner face of cover skirt 43 and 43a and performs functions with respect to spout 34 similar to the functions of skirt 43 and 43a with respect to vessel 30 and the hollow handle 32–33–33a. Thus, skirt 59 also has an intermediate rim 46b and oppositely sloping walls therefrom 47b and 48b.

In order that closure skirt 59 in the embodiment A sealably and frictionally engage skirt 43 for live connection therewith and to impose downward pressure on closure body 49 against the upper face of cover member top wall 38, end extensions 60 and 61 are provided to overlap cover skirt edges 44 and 45, said extensions conforming in curvature with skirt 43 and having tangential inner faces in contacting relationship with the outer face portions of skirt 43 adjacent ends 44 and 45 as shown in FIGURE 3.

In applying and removing the cover member 37 for the vessel 30 when said cover is of resiliently flexible plastic as seen in FIGURE 8, the cover may be aligned with the vessel top open edge 36–36a and forced thereover for snapping engagement. A suitable procedure is to first fit cover skirt portion 43a over the handle open top edge 36a for engagement therewith and then to force the remainder of skirt 43 over vessel top edge 36 for snapping engagement with the vessel flared wall portion 35. It is understood that the flare 35 in the vessel 30, handle 32–33 and spout 34 may be substituted by a beaded edge as is conventional.

In applying cover member 37 to vessel 30 as aforesaid, it is preferable that the closure be in open position during the operation as seen in FIGURE 3, and be independently closed by snap engagement thereafter for maintaining complete sealing of the contents.

In removing the cover member 37 from vessel 30, it has been found most suitable to first flex and then lift the cover from the "heel" part as at 43a, and then to pull off the rest of the cover as seen in FIGURE 8.

When the cover member is formed of substantially rigid plastic as indicated by numeral 37' in FIGURE 9, the same procedure is followed except that in removal, the "heel" part as at 43a is not flexed as seen in FIGURE 8.

The vessel, cover and spout closure parts above described may be molded by standard resin-molding techniques. However, when a substantially rigid part is formed of metal, glass, composition or other non-resinous material, the other complementary and engageable part is formed of resinous material as mentioned to effectuate a live, seal-tight, frictional and disengageable joint.

Furthermore, each of said parts is constructed and shaped for easy assemblage and disassemblage with the other parts, for easy accessibility to cleaning and washing, for natural draining or shedding of clinging or residual vessel contents after each use of the device, and for elimination of dirt and vessel content collecting traps.

Additionally, the cover member being engageable with the vessel at a rigid, strong and pressure-resistant joint, same serves as an ice-guard for chilled fluid contents when pouring is effected through the spout of the device.

It is understood that minor changes and modifications in the material, location, integration, shape, size of parts and all types of molding including injection, compression and vacuum may all be resorted to without departing from the spirit of the invention and the scope of the appended claims.

I claim:

1. A pitcher, cover and cap combination including an open top pitcher, the upper edge of the pitcher being flared outwardly; a pouring spout extending transversely outwardly from said pitcher, said pouring spout being integral and continuous with the side wall of the pitcher; the upper edge of the pouring spout being flared outwardly and forming a continuation of the upper edge of the pitcher; a flanged cover for said pitcher positionable on said upper edge of the pitcher, an opening in said cover having outer portions terminating short of said pouring spout but adjacent said pouring spout; a downwardly directed short flange affixed to the outer continuous edge of said cover; an inwardly sloping wall on the side of said flange facing the pitcher, said sloping wall conforming substantially with and tightly engaging the outside of said flared upper edge of the pitchers; a cap pivotally mounted on said cover and swingable from an open position to a closed position, said cap including a substantially flat plate overlying said opening in the cover, a second downwardly directed short flange affixed to said flat plate of said cap and conforming to said flared upper edge of the pouring spout, an inwardly sloping wall on the side of said second flange facing said pouring spout, said sloping wall conforming substantially with and tightly engaging the outside of said flared upper edge of the pouring spout; said second flange forming a continuation of said flange on the cover thereby sealing the contents of the pitcher; and a third flange affixed to the underside of said flat plate of the cap and conforming to at least part of the outer portions of the cover opening and engageable with said part of the outer portions when the cap is in closed position.

2. The combination according to claim 1 wherein said second flange engages and slightly overlaps the flange on the cover to provide a seal between the flanges.

3. A cover and closure combination for use on a container having bottom and side walls and a top opening, the top of said side wall having outward extensions forming a peripheral rim at said opening, a pouring spout integral with and extending transversely outwardly from said side wall and forming an extension part of said top opening, an extension of said rim along said pouring spout; said cover overlying a major portion of said top opening and terminating short of and adjacent to said pouring spout; a downwardly directed flange integral with the underside of the cover; said flange resiliently and tightly engaging said rim to releasably unite the cover and container; a closure swingably mounted on said cover and movable to and from open and closed positions; said closure overlying said extension part of the top opening when the closure is in closed position; a downwardly directed flange integral with the underside of said closure, said flange resiliently and tightly engaging said extension of the rim to releasably close said pouring spout to seal the contents of said container; and said closure flange engaging and slightly overlapping the cover flange adjacent the pouring spout.

References Cited by the Examiner

UNITED STATES PATENTS

| | | | |
|---|---|---|---|
| 2,746,199 | 9/56 | Tupper. | |
| 2,764,200 | 9/56 | Gits | 150—.5 |
| 2,805,561 | 9/57 | Emmert et al. | 222—545 X |
| 2,832,517 | 4/58 | Baumgartner | 222—545 |
| 2,886,218 | 5/59 | Marcus | 222—556 X |

LOUIS J. DEMBO, *Primary Examiner*.